US009411693B2

(12) United States Patent
 Solihin

(10) Patent No.: US 9,411,693 B2
(45) Date of Patent: Aug. 9, 2016

(54) DIRECTORY ERROR CORRECTION IN MULTI-CORE PROCESSOR ARCHITECTURES

(75) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 664 days.

(21) Appl. No.: 13/817,695

(22) PCT Filed: Jul. 31, 2012

(86) PCT No.: PCT/US2012/048997
§ 371 (c)(1),
(2), (4) Date: Feb. 19, 2013

(87) PCT Pub. No.: WO2014/021853
PCT Pub. Date: Feb. 6, 2014

(65) Prior Publication Data
US 2014/0040676 A1    Feb. 6, 2014

(51) Int. Cl.
 *G06F 11/16* (2006.01)
 *G06F 11/10* (2006.01)
 *G06F 11/20* (2006.01)
 *G06F 12/08* (2016.01)

(52) U.S. Cl.
 CPC ........ *G06F 11/1612* (2013.01); *G06F 11/1064* (2013.01); *G06F 11/1666* (2013.01); *G06F 12/0815* (2013.01); *G06F 12/0817* (2013.01); *G06F 11/20* (2013.01)

(58) Field of Classification Search
 None
 See application file for complete search history.

(56) References Cited

U.S. PATENT DOCUMENTS

| | | | |
|---|---|---|---|
| 6,633,958 B1 * | 10/2003 | Passint | G06F 12/0826 711/119 |
| 2002/0124143 A1 | 9/2002 | Barroso et al. | |
| 2003/0163543 A1 | 8/2003 | Deneroff | |
| 2007/0038798 A1 | 2/2007 | Bouchard et al. | |
| 2010/0138607 A1 | 6/2010 | Hughes et al. | |
| 2010/0180084 A1 * | 7/2010 | Cypher | G06F 12/0817 711/135 |

(Continued)

OTHER PUBLICATIONS

Zhang, Wei, et al. "ICR: In-cache replication for enhancing data cache reliability." IEEE, 2003.*

(Continued)

*Primary Examiner* — Charles Rones
*Assistant Examiner* — Hewy Li
(74) *Attorney, Agent, or Firm* — Moritt Hock & Hamroff LLP; Steven S. Rubin, Esq.

(57) ABSTRACT

Technologies are generally described that relate to processing cache coherence information and processing a request for a data block. In some examples, methods for processing cache coherence information are described that may include storing in a directory a tag identifier effective to identify a data block. The methods may further include storing a state identifier in association with the tag identifier. The state identifier may be effective to identify a coherence state of the data block. The methods may further include storing sharer information in association with the tag identifier. The sharer information may be effective to indicate one or more caches storing the data block. The methods may include storing, by the controller in the directory, replication information in association with the sharer information. The replication information may be effective to indicate a type of replication of the sharer information in the directory, and effective to indicate replicated segments.

31 Claims, 8 Drawing Sheets

(56) References Cited

U.S. PATENT DOCUMENTS

2010/0185897 A1 7/2010 Abts et al.
2010/0274971 A1 10/2010 Solihin

OTHER PUBLICATIONS

Sanchez, Daniel and Kozyrakis, Christos. "SCD: A Scalable Coherence Directory with Flexible Sharer Set Encoding." IEEE. 2012.*
Borkar, S. & Chien, A. A., The Future of Microprocessors, Communications of the the ACM, pp. 67-77, vol. 54, No. 5.
Conway, P. et al., Cache Hierarchy and memory Subsystems of the AMD Opteron Processor, IEEE Micro, Mar. 2010, pp. 16-29, vols. 30, Issue 2.
Lee H. et al., Perfectory: A Fault-Tolerant Directory Memory Architecture, IEEE Transactions on Computers, May 2010, 638-650, vol. 59, No. 5.
Alameldeen, A. R. et al., Energy-Efficient Cache Design Using Variable-Strength Error-Correcting Codes, Proc. of the International Symposium on Computer Architecture, 2011, 11 pages.
Wilkerson, C. et al., Reducing Cache Power with Low-Cost, Multi-bit Error-Correcting Codes, Intel Labs, ISCA'10, Jun. 19-23, 2010, 11 pages.
International Search Report and Written Opinion for application with application No. PCT/US12/48997, dated Nov. 26, 2012, 16 pages.

* cited by examiner

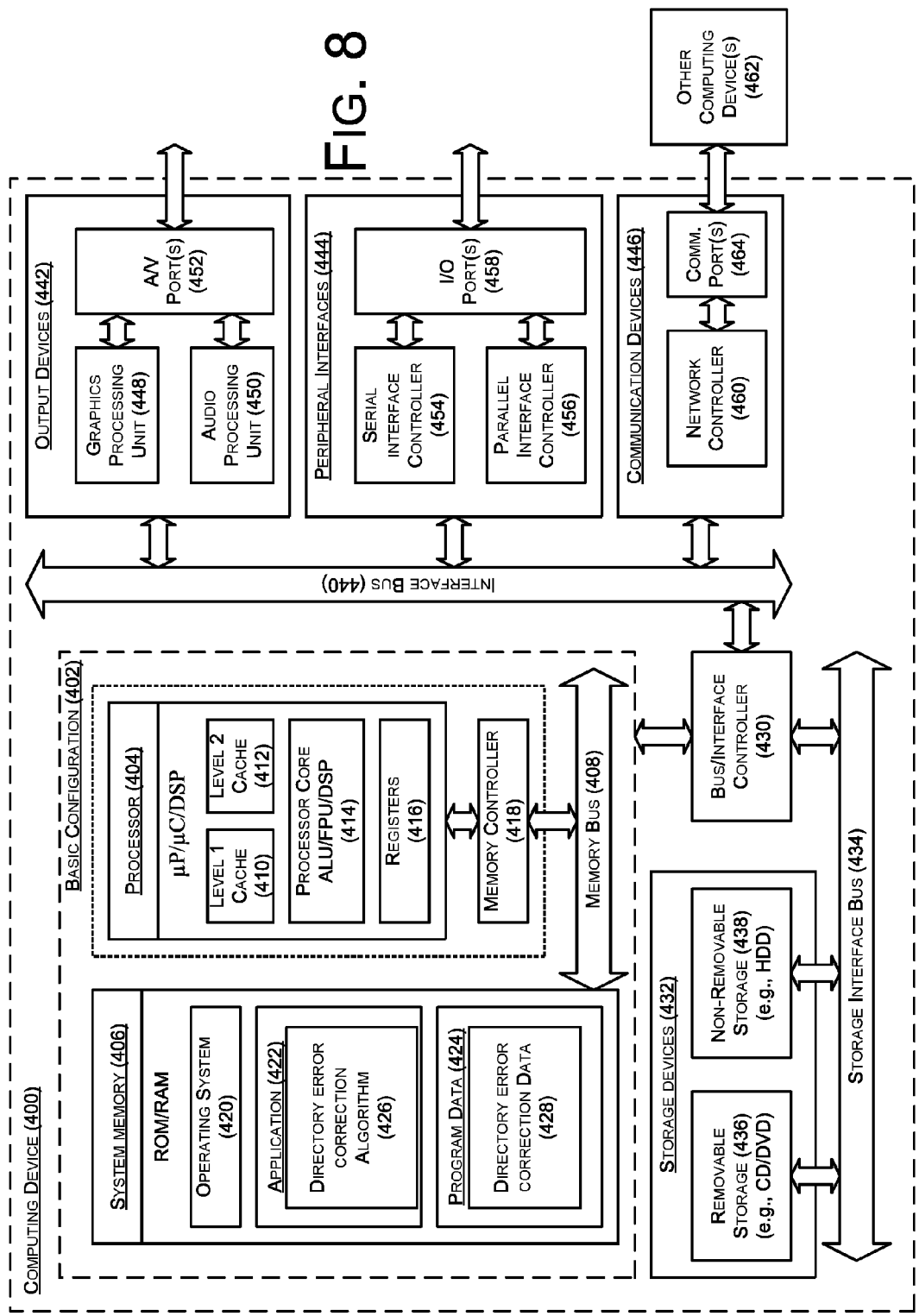

DIRECTORY ERROR CORRECTION IN MULTI-CORE PROCESSOR ARCHITECTURES

CROSS REFERENCE TO RELATED APPLICATION

This application is a U.S. National Stage filing under U.S.C. §371 of International Application No. PCT/US12/48997 filed Jul. 31, 2012. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

In multi-core processor architectures, multiple processor cores may be included in a single integrated circuit die or on multiple integrated circuit dies that are arranged in a single chip package. A cache may be used to store data for access by one or more of the processor cores. The data can be a subset of data stored in a larger memory that is typically located outside of the die. Each processor core may be provided with a cache that is used to store data for the corresponding processor. As a single piece of data may be stored in multiple caches, a cache coherence protocol may be employed to keep track of the data stored in multiple caches. State information for data blocks in the cache may be stored in a directory and a cache coherence protocol may be implemented to ensure that the appropriate data is identified and returned in response to requests for data blocks.

SUMMARY

In some examples, methods for storing cache coherence information in a directory of a multi-core processor are generally described. Some methods may include monitoring, by a controller, in the directory, memory requests in the multi-core processor. In response to monitoring, some methods may include storing, by the controller, in the directory a tag identifier effective to identify a data block. In response to monitoring, some methods may include storing, by a controller, in the directory, a state identifier in association with the tag identifier. The state identifier may be effective to identify a coherence state of the data block. In response to monitoring, some methods may include storing, by the controller, in the directory, sharer information in association with the tag identifier. The sharer information may be effective to indicate one or more caches storing the data block. In response to monitoring, some methods may include storing, by the controller, in the directory, replication information in association with the sharer information. The replication information may be effective to indicate a type of replication of the sharer information in the directory.

In some examples, methods for processing a request for a data block in a multicore processor are generally described. Some methods may include receiving, by a controller in a cache coherence directory of the multicore processor, the request. Some methods may include identifying, by the controller in the directory, a tag identifier associated with the data block. Some methods may include analyzing, by the controller in the directory, a state identifier associated with the tag identifier. The state identifier may be effective to indicate a cache coherence state of the data block. Some methods may include analyzing, by the controller in the directory, sharer information associated with the tag identifier. The sharer information may be effective to identify one or more caches storing the data block. The sharer information may be stored in a sharer table including at least two segments. Some methods may include analyzing, by the controller in the directory, replication information associated with the sharer information. The replication information may be effective to indicate a type of replication of the sharer information in the directory. Some methods may include detecting, by the controller in the directory, an error in one or more segments in the sharer table. Some methods may include, in response to detecting an error in a first segment in the sharer table, identifying, by the controller, using the replication information, one or more other segments that replicate the sharer information in the first segment. In response to detecting the error, some methods may include processing, by the controller, the request by analyzing the sharer information from the identified one or more other segments.

In some examples, multi-core architectures effective to store cache coherence information in a directory of a multi-core processor are generally described. The architectures may include a first tile, a second tile, a controller and a memory. In some architectures, the first tile may include a first processor and a first cache. In some architectures, the second tile may include a second processor and a second cache. In some architectures, the controller may be configured in communication with the first tile and the second tile. In some architectures the memory may be configured in communication with the controller. In some architectures, the controller may be effective to monitor memory requests in the multi-core processor. In response to the memory requests, the controller may be effective to store, in the directory, a tag identifier effective to identify a data block. In response to the memory requests, the controller may be effective to store, in the directory, a state identifier in association with the tag identifier. The state identifier may be effective to identify a coherence state of the data block. In response to the memory requests, the controller may be effective to store, in the directory, sharer information in association with the tag identifier. The sharer information may be effective to indicate one or more caches storing the data block. In response to the memory requests, the controller may be effective to store, in the directory, replication information in association with the tag identifier. The replication information may be effective to indicate a type of replication of the sharer information in the directory.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 is a block diagram illustrating an example computing device that is arranged to implement directory error correction in a multi-core processor architecture, all arranged according to at least some embodiments described herein.

DETAILED DESCRIPTION

Figure 1:
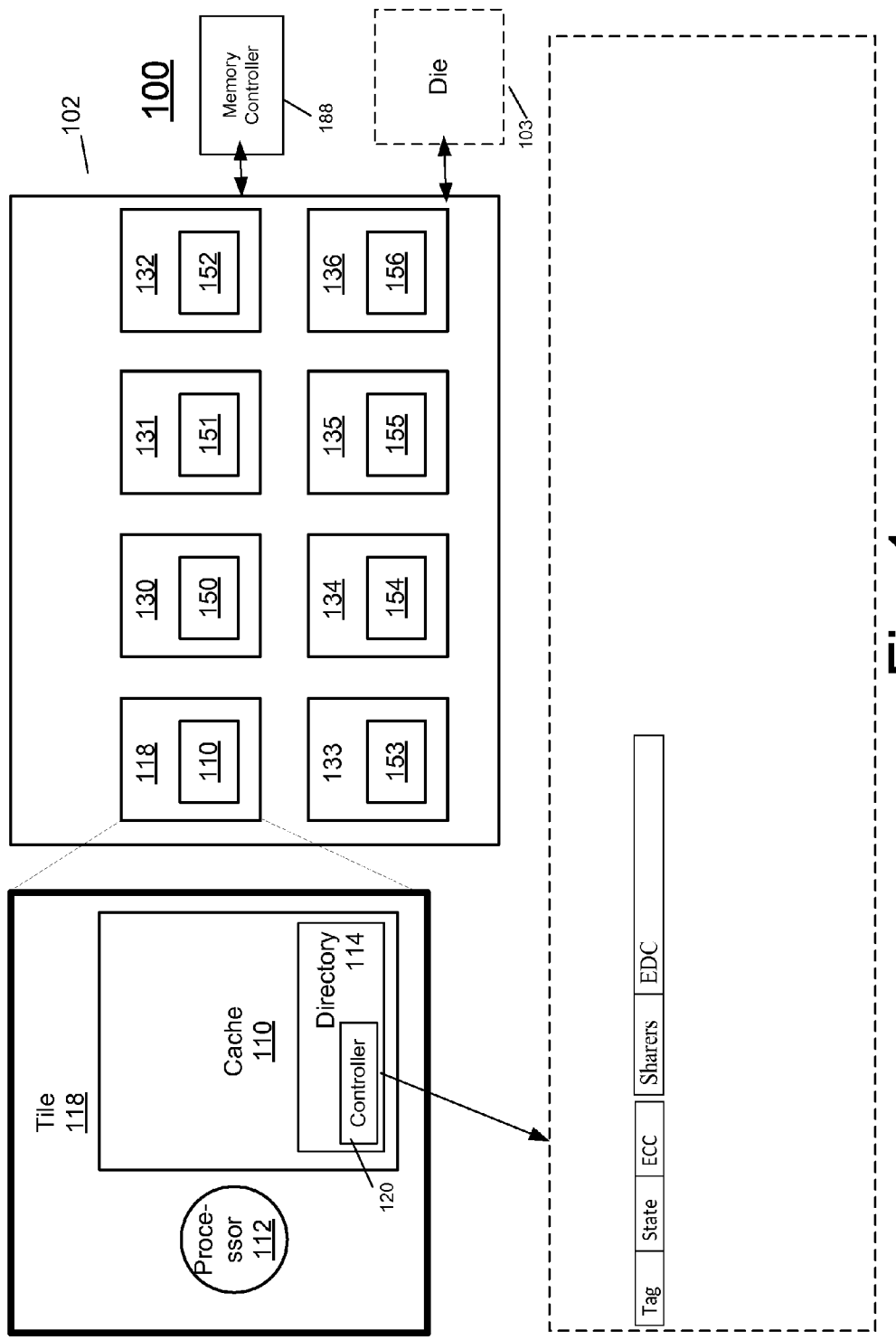
FIG. 1 illustrates an example system that can be utilized to implement directory error correction in a multi-core processor architecture.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to directory error correction in multi-processor architectures.

Briefly stated technologies are generally described that relate to processing cache coherence information and processing a request for a data block. In some examples, methods for processing cache coherence information are described that may include storing in a directory a tag identifier effective to identify a data block. The methods may further include storing a state identifier in association with the tag identifier. The state identifier may be effective to identify a coherence state of the data block. The methods may further include storing sharer information in association with the tag identifier. The sharer information may be effective to indicate one or more caches storing the data block. The methods may include storing, by the controller in the directory, replication information in association with the sharer information. The replication information may be effective to indicate a type of replication of the sharer information in the directory, and effective to indicate replicated segments.

FIG. 1 illustrates an example system that can be utilized to implement directory error correction in multi-core processor architectures, arranged in accordance with at least some embodiments described herein. An example system 100 may include a die 102 including a plurality of tiles, and/or memory controller 188. Focusing on tile 118 for illustration, each tile 118 may include a cache 110, one or more processors or processor cores (hereinafter referred to as "processor") 112, and/or a directory 114. Processor 112 may be adapted to process data including code (hereinafter both data and/or code may be referred to as "data block"). Cache 110 may be configured to store a data block local to processor 112. Directory 114 may include a directory controller 120. Directory controller 120 may be used to control operations of directory 114 as explained herein.

As is described in more detail below, directory controller 120 may be configured to store an error correction code and/or an error detection code in directory 114 to handle errors that may occur in directory 114. An error correction code may be used in association with data in tag and state fields and an error detection code may be used in association with data in sharer fields. Over time, as die 102 is used, errors may occur in directory 114. For example, hardware errors may occur where physical components in hardware break down over time or due to imperfection in manufacturing. Soft errors may occur such as when a logic 0 value erroneously drifts to a logic 1 value or when a logic 1 value erroneously drifts to a logic 0 value (e.g., in situations where the logic gate is struck by a particle emitted in the air). Error correction and detection codes as discussed herein may be used to detect and/or correct these described errors and others.

Die 102 may include a matrix (e.g., array) of tiles 118, 130-136 including respective caches 110, 150-156. Each tile may also include one or more of a respective processor 112 and/or directory 114. Each tile in die 102 may be substantially the same as in a homogenous arrangement, or some tiles may be different as in a heterogeneous arrangement. Die 102 may be arranged in communication with another die 103 so that data blocks may be shared among a plurality of dies. Die 102 may be further arranged in communication with memory controller 188.

Directory 114 may be a data structure that identifies (e.g., indexes) a location associated with each data block that is stored in the tiles of die 102. Directory 114 may be located in a single tile on die 102, distributed among many or all tiles, implemented separately from other tiles, or distributed between structures in the die and off the die. If directory 114 is distributed, for example, a first range of addresses (such as 0x0000-0x1000) may be stored in a first tile, a second range of addresses (such as 0x1001-0x2000) stored in a second tile, etc. Directory 114 in the figure may illustrate a first portion of an entire die directory. A first portion may be stored in tile 118 and additional portions may be stored in other tiles such as tiles 130, 131, 132, etc.

Directory 114 may include a tag identifying a data block stored in die 102, along with a state of the data block and sharer information effective to indicate the caches that may be sharing the data block. For example, directory 114 may use a MESI cache coherence protocol or its variants, such as MOESI, MSI, MOSI etc. In a MESI protocol, directory 114 may keep track of sharing states for data blocks, including:

exclusive-modified ("EM") such as when a data block has been modified since the block was retrieved from a main memory or when a data block is in one cache but the block matches a main memory;

shared ("S") such as when the data block may be stored in one or more caches and the data block matches the main memory;

invalid ("I") such as when the data block is invalid;

uncached ("U") such as when the data block is not cached; and/or owned ("O") such as when the indicated data block includes the most recent copy of the data block.

Figure 2:
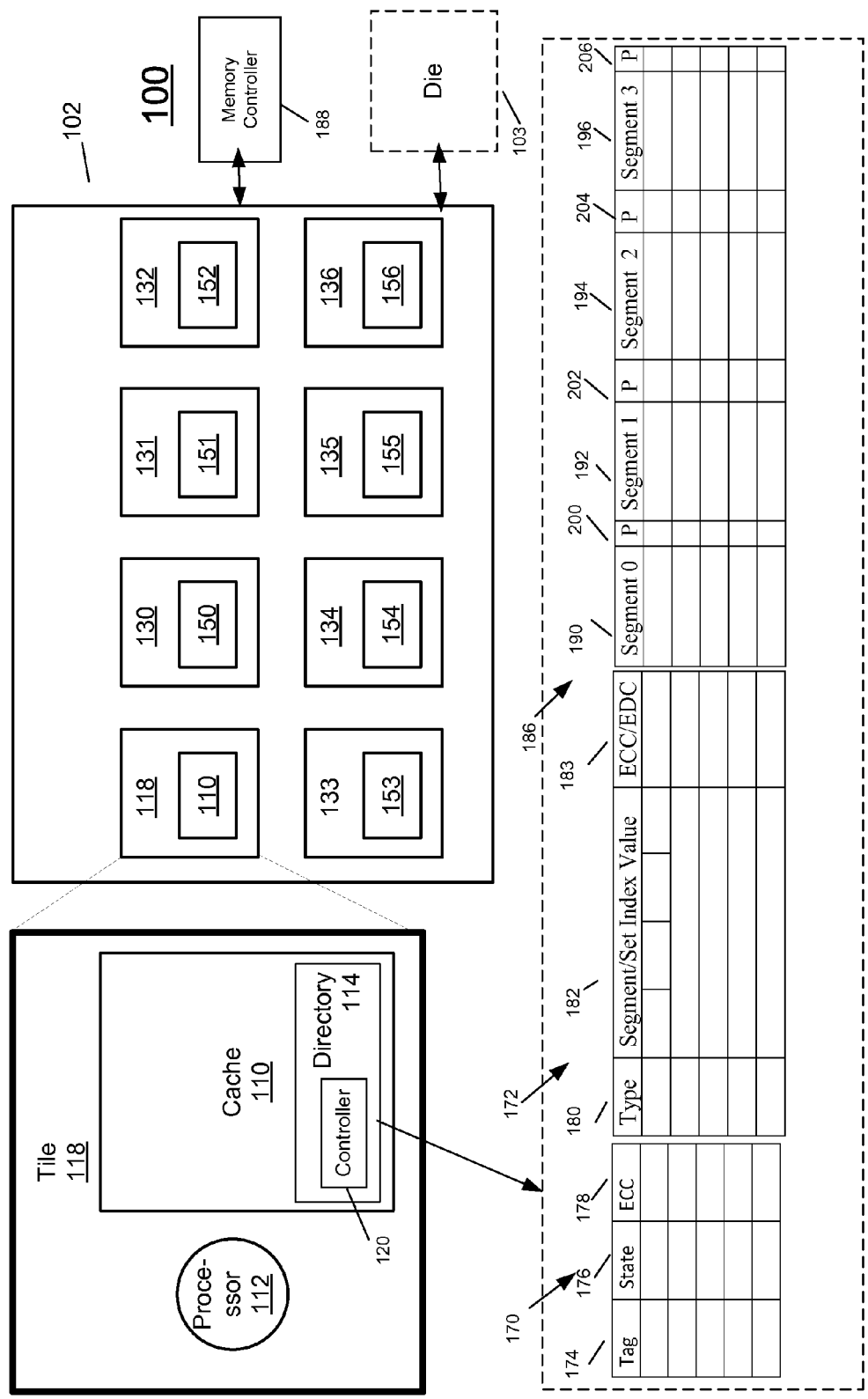
FIG. 2 illustrates an example system that can be utilized to implement directory error correction in a multi-core processor architecture.

FIG. 2 illustrates an example system that can be utilized to implement directory error correction in multi-core processor architectures, arranged in accordance with at least some embodiments described herein. FIG. 2 is substantially similar to system 100, with additional details. Those components in FIG. 2 that are labeled identically to components of FIG. 1 will not be described again for the purposes of clarity.

Directory 114 may be configured to monitor memory requests in die 102 and, in response, store coherence information relating to data blocks stored in caches. For example, directory controller 120 may be configured to store in directory 114 a tag/state table 170, a segment or set index table 172, and/or a sharer table 186 relating to data blocks stored in caches in die 102. Tag/state table 170, segment or set index table 172 and sharer table 186, in combination, may form directory 114. A row in directory 114 may be divided into two or more columns belonging to one or more of tables 170, 172, 186. Tag/state table 170 may include information in fields such as tag 174, state 176 and/or error correction code ("ECC") 178. Error correction code 178 may correspond one-to-one to a row tag and state, or one-to-many rows of tags and states. Tag field 174, state field 176 and error correction code field 178 may be associated with each other. Tag field 174 may include indications of blocks of data stored in die 102. State field 176 may indicate a coherence state of these data blocks using one of the above mentioned protocols. Error correction code 178 may include a code that may be used to correct errors in entries in tag field 174 and/or state field 176. Error correction code 178 may be used to replicate bits in tag field 174 and/or state field 176. Enough bits may be replicated so that if an error does occur, code 178 may be used to detect that the error occurred, identify the bit with the error, and flip the applicable bit to correct the error. Error correction code 178 may use bit interleaving.

Segment or set index table 172 may include information such as a type field 180, a segment or set index value field 182 and an error correction code/error detection code field 183. Data blocks in a row of segment or set index table 172 may be stored by directory controller 120 in association with data blocks in a corresponding row in tag/state table 170. Segment or set index table 172 may also include an error correction code or error detection code field 183 that may be used to detect and/or correct errors in segment or set index table 172. As discussed herein, type field 180 may include replication information identifying a type of replication used by directory controller 120 for data blocks stored in sharer table 186. In an example, four different replication types may be used where sharer information is stored in one or more segments of sharer table 186. The sharer information may relate to a row in sharer table 186 and/or one or more segments in sharer table 186:

"UR"—which may correspond to Un-Replicated, where sharer information is not replicated;

"SR"—which may correspond to Segment-Replicated, where sharer information stored in two or more segments is replicated in other segments in the same directory row;

"ER"—which may correspond to Entry-Replicated, where an entire row of sharer information is replicated in another row; and "FR"—which may correspond to Full Segment-Replicated, where the sharer information stored in one segment is replicated in all other segments in the same directory row.

The sharer information may be useful to identify caches in the die that may store the data block corresponding to the tag identifier associated with the sharer information. The sharer information may be stored in one or more segments of sharer table 186 in one or more formats, including but not limited to the following formats:

Full bit vector—in the full bit vector format, each bit in a sharer segment may correspond to one cache 110.

Pointer—in the pointer format, two or more bits in a sharer segment may identify one cache, and each cache may be identified by a unique combination of the values of the two or bits in a sharer segment. For example, "00" may correspond to cache 110, "01" may correspond to cache 150, "10" may correspond to cache 151, and "11" may correspond to cache 152.

Coarse bit vector—in the coarse bit vector format, each bit in a sharer segment may identify a group of two or more caches. For example, the first bit may correspond to a group that includes cache 110 and 150, and the second bit may correspond to a group that includes cache 151 and cache 152, etc.

Sharer table 186 may be divided into two or more segment fields 190, 192, 194, 196 (segments 0, 1, 2 and 3 are shown in the figure) and two or more parity fields 200, 202, 204, 206. A size and number of segments may be defined based on a number of bits used to encode an identifier of a cache according to one or more of the above formats. Parity fields 200, 202, 204, 206 may correspond to a 1 bit value that may be used to indicate erroneous or error-free data blocks in the corresponding segment.

Data blocks may be stored in sharer table 186 by directory controller 120 in a manner effective to replicate the sharers data blocks. Replication may be used to detect and correct errors in the sharer information. Through replication, sharer table 186 may allow for error detection and correction using an error detection code in the form of parity fields 200, 202, 204, 206.

For example, if relevant sharer information is stored in segment 0, that same sharer information may be replicated in segments 1, 2 and 3. If the sharer information indicates that one cache is sharing the block of data associated with a tag identifier, an identifier for that one cache may be stored in one segment (e.g. segment 0). Directory controller 120 may be configured to replicate the cache identifier in the other segments, such as segments 1, 2 or 3. In examples where blocks are shared in only one or two caches, directory controller 120 may be configured to store identifiers for those caches in a first set of segments, and replicate those identifiers in a second set of the segments. Directory controller 120 may further be effective to store in table 172 an identification of other locations in shared table 186, where sharer information may be replicated. These other locations identified in sharer table 186 may be analyzed by directory controller 120 in the event of an error so that an identification of a cache storing a requested block may be found when an error is detected in one or more segments of the sharer table.

Figure 3:
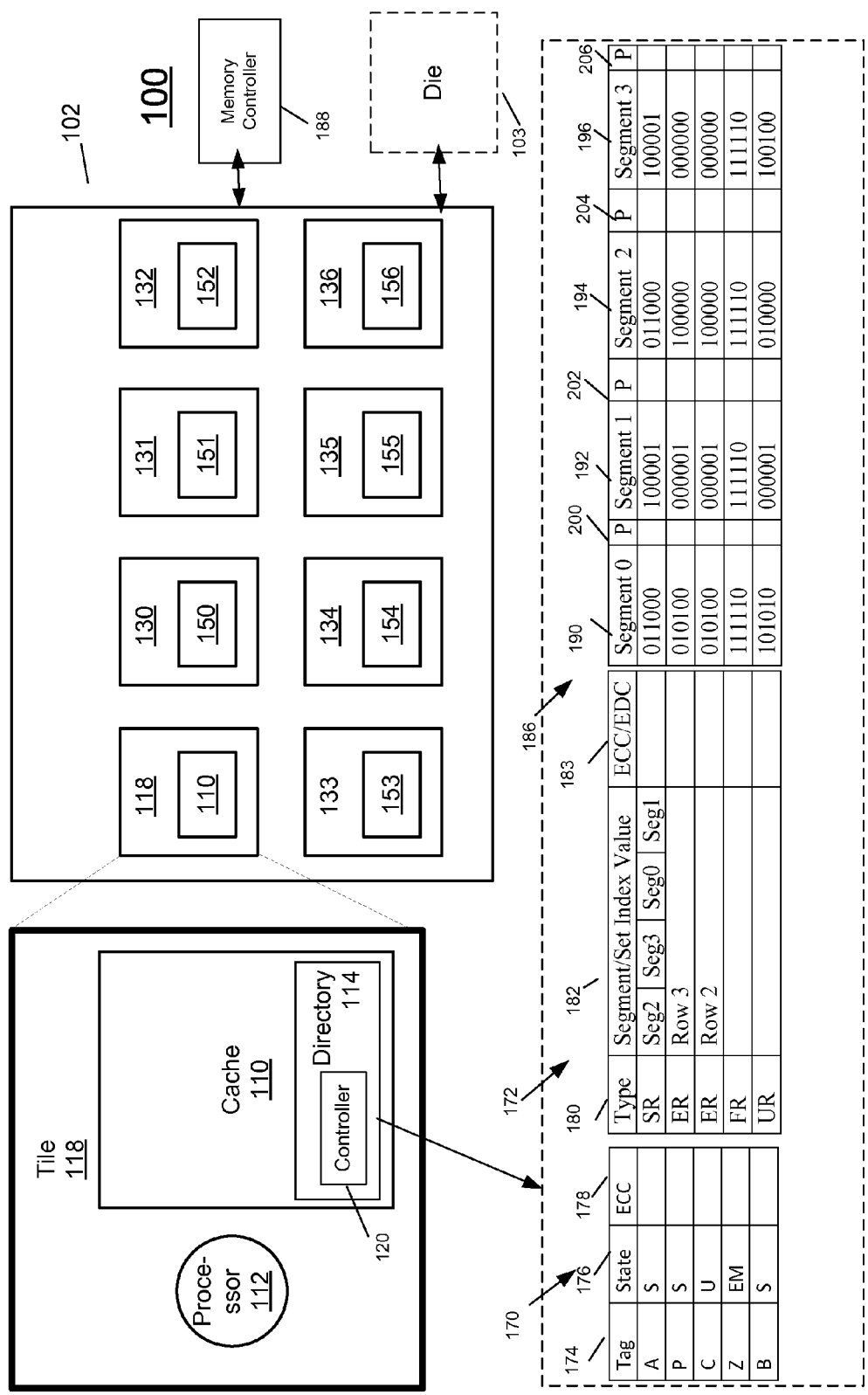
FIG. 3 illustrates an example system that can be utilized to implement directory error correction in a multi-core processor architecture.

FIG. 3 illustrates an example system that can be utilized to implement directory error correction in multi-core processor architectures, arranged in accordance with at least some embodiments described herein. FIG. 3 is substantially similar to system 100, with additional details. Those components in FIG. 3 that are labeled identically to components of FIGS. 1 and 2 will not be described again for the purposes of clarity.

In the examples shown, block "Z" is indicated as being stored in an exclusive modified state ("EM") and so block Z is stored by only one cache. Directory controller 120 may be configured effective to read this EM state and determine that full replication "FR" may be used. FR may be used because an identifier corresponding to only one cache should be stored in sharer table 186 and the size in number of bits of such an identifier may be less than the size of a segment in the sharer table. Directory controller 120 may be configured effective to store an identifier corresponding to the cache storing block Z ("111110") in sharer table 186. Directory controller 120 may be configured to replicate "111110" in all segments in sharer table 186 in the same row as the tag for block Z. Directory controller 120 may be effective to store "FR" in type field 180 in the same row associated with block Z.

Continuing with the examples shown, block A is indicated as being shared by more than one cache ("S"). For example, block A may be stored by a number of caches such that an encoding for the identifier for those caches has a size less than or equal to the size of half the number of available segments. Because the size of the identifier corresponds to less than half the number of available segments, segment replication SR may be used. Directory controller 120 may be configured to store identifiers for the two caches storing block A. As only two segments (e.g. segments 0 and 1) are used to store the sharer indications, two other segments (segments 2 and 3) are available for replication of the sharer indications.

Directory controller 120 may be adapted to store identifiers corresponding to the caches indicated as storing block A in sharer table 186. Directory controller 120 may be configured to store pointers in segment/set index table 172 pointing to other locations in sharer table 186 where sharers data block can be replicated. In the example, segment or set index table 172 may include a pointer indicating that segment 0 in sharer table 186 includes replicated information for segment 2. "Seg 2" is shown in segment/set index table 172 in the first or segment 0 slot. Similarly, segment or set index table 172 may include a pointer indicating that segment 1 in sharer table 186 includes replicated information for segment 3. "Seg 3" is shown in segment/set index table 172 in the second or segment 1 slot. Segment or set index table 172 may include a pointer indicating that segment 2 in sharer table 186 includes replicated information for segment 0. "Seg 0" is shown in segment/set index table 172 in the third or segment 2 slot. Segment/set index table 172 includes a pointer indicating that segment 3 in sharer table 186 includes replicated information for segment 1. "Seg 1" is shown in segment/set index table 172 in the fourth or segment 3 slot. In the described example, block A may be stored by two caches. The identifier corresponding to the first cache can be stored in sharer table 186 in slots for segments 0 and 2. The identifier for the second cache can be stored in sharer table 186 in slots for segments 1 and 3.

Figure 4:
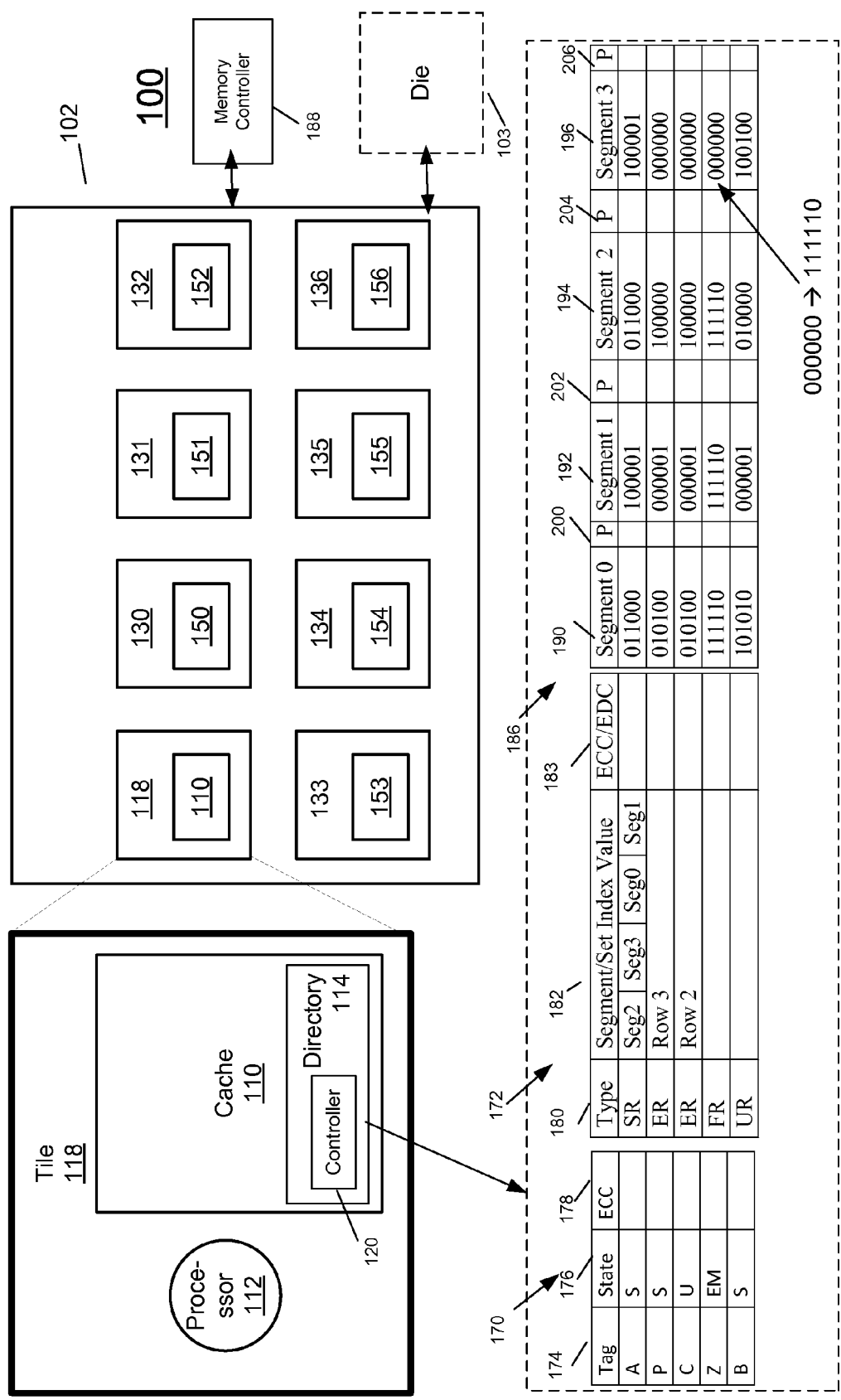
FIG. 4 illustrates an example system that can be utilized to implement directory error correction in a multi-core processor architecture.

FIG. 4 illustrates an example system that can be utilized to implement directory error correction in multi-core processor architectures, arranged in accordance with at least some embodiments described herein. FIG. 4 is substantially similar to system 100, with additional details. Those components in FIG. 4 that are labeled identically to components of FIGS. 1, 2 and 3 will not be described again for the purposes of clarity.

In examples where segment replication ("SR") or full replication ("FR") is used, directory controller 120 may also perform error detection using the replicated data block. Error detection may be performed by directory controller 120 comparing values for stored identifiers so that one or more bits of error can be detected. Directory controller 120 may be adapted to use a value of a cache identifier that is stored in at least two different locations in sharer table 186. If a value is stored in at least two different locations, there is a greater likelihood that his value is not an error. In an example, for block Z, full replication "FR" is indicated in type field 180 in segment or set index table 172. Directory controller 120 may analyze sharer table 186 and determine that fields 190, 192 and 194 all have a cache identifier of "111110". As the cache identifier "111110" is stored in at least two different locations it is likely that this value is correct. Moreover, as field 196 indicates a different value, "000000", it is likely that the value in field 196 is incorrect. Directory controller 120 may be configured to change the value in field 196 to indicate "111110".

Referring again to FIG. 3, block P is indicated as being stored by more than one cache. In the example, block P may be shared by a number of caches so that replication may not be performed by segments in the same row because an identifier for the caches that store block P may be larger in size than the combined size of half the segments. For example, block P may be stored in a numbers of caches corresponding to more than half the number of segments. In the described example, directory controller 120 may determine that block C is indicated as being uncached ("U"). As block C is uncached, storage space in the sharer table 186 in the row associated with block C is available to be used. Directory controller 120 may be configured to use storage space in the row associated with block C in sharer table 186 to store sharer information for another block—such as block P. Directory controller 120 may be configured to store indications in table 172 indicating that sharer information for block P is replicated in the second and third rows of sharer table 186. The second and third rows of sharer table 186 correspond to rows for block P and block C. Directory controller 120 may indicate in table 172 that a type of replication associated with block P is ER—entry-replicated. Directory controller 120 may store a pointer in the second row of table 172 indicating that data blocks for the second row is replicated in the third row. Similarly, directory controller 120 may be configured to store a pointer in the third row of table 172 indicating that data blocks for row 3 is replicated in row 2.

In the examples shown, block B is indicated as being shared by too many caches, corresponding to a cache identifier that is too large to use segment replication. For example, block B is shown as shared in a number of caches that correspond to a cache identifier that is larger than the combined size of half the number of segments. Further, no other row appears to be available in the sharer table since there are no available rows where the state identifier is "U". Directory controller 120 may be configured to assign no replication "UR" or un-replicated to block B. If an error is detected by the directory controller relating to sharers data for block B, a cache coherence error recovery protocol may be used.

Figure 5:
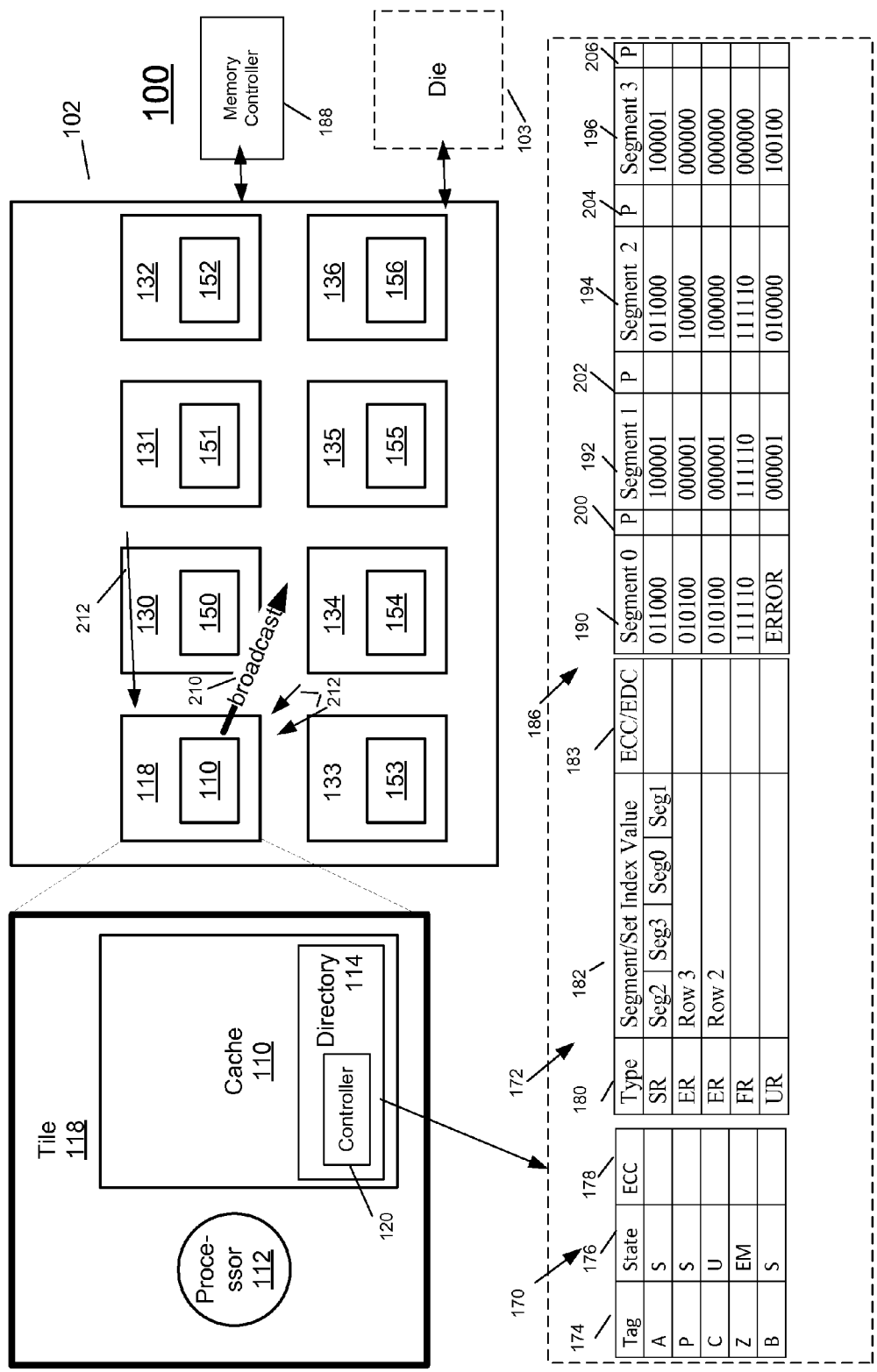
FIG. 5 illustrates an example system that can be utilized to implement directory error correction in a multi-core processor architecture.

FIG. 5 illustrates an example system that can be utilized to implement directory error correction in multi-core processor architectures, arranged in accordance with at least some embodiments described herein. FIG. 5 is substantially similar to system 100, with additional details. Those components in FIG. 5 that are labeled identically to components of FIGS. 1, 2, 3 and 4 will not be described again for the purposes of clarity.

In the example, block B is indicated as being un-replicated. If an error is detected by directory controller 120 relating to sharers data for block B, a cache coherence error recovery protocol may be used. In such a cache coherence error recovery protocol, directory controller 120 may be configured to send a broadcast message 210 to all caches in die 102. The message may include a request requesting locations of a particular block. Tiles in die 102 may be configured to respond to broadcast message 210 with reply messages 212. Reply messages 212 may indicate whether the respective caches are storing the block. Directory controller 120 may be configured to receive the reply messages 212 and update sharer table 186 in directory 114 accordingly.

Referring again to FIG. 3, in an example, directory controller 120 may be configured to receive a request from a tile.

The request may be for a particular block that may be stored in one of the caches in die 102. Directory controller 120 may be configured to analyze tag/state table 170 to identify a particular row in directory 114. The particular row may be storing a tag associated with the particular block. Once the particular row is identified, directory controller 120 may be configured to analyze the state field in the row to identify a cache coherence state of the particular block. Directory controller 120 may be configured to analyze type field 180 for the particular row to determine a type of replication that may be used for the sharer information for the particular block. Directory controller 120 may then analyze sharer table 186 to determine an identifier of the cache or caches that may be storing the particular block. If the corresponding parity field 200, 202, 204, 206 indicates that the sharer information is error-free, directory controller 120 may use the determined cache identifier to retrieve the particular block.

If the corresponding parity field indicates that the sharer information is invalid, directory controller 120 may analyze other locations in sharer table 186 for the sharer information. The other locations may be based on the type of replication identified in segment or set index table 172. If a segment replication "SR" is identified in type field 180, directory controller 120 may analyze another segment in the particular row of sharer table 186 identified by the pointer in table 172. If a full segment replication "FR" is indentified in type field 180, directory controller 120 may also analyze another segment in the particular row. If an entry replication "ER" is indentified in type field 180, directory controller 120 may analyze another row in sharer table 186 identified by the pointer in table 172. In examples where all of the data blocks in sharer table 186 indicate an invalid parity status or where the replication type indicates un-replicated "UR", directory controller 120 may use the cache coherence error recovery protocol discussed above to identify a location of the particular block. Directory controller 120 may be configured to send a request to all tiles in the die requesting the particular block. When the location of the particular block is determined, directory controller 120 may be configured to overwrite the corresponding segment or segments in sharer tables 186 with the correct sharers data blocks.

Parity fields 200, 202, 204, 206 may be modified by directory controller 120 based on coherence events. An example of a coherence event may be where a cache requests to read a block where the directory indicates that the block is shared by the requesting cache. Another example of a coherence event is where a cache requests to write to a block and the directory indicates that the block is not stored by the cache requesting to write.

Among other possible benefits, a system in accordance with the present disclosure may allow for use of a directory based cache coherence protocol with error detection, without necessarily using large amount of storage overhead. Multiple bit error correction and detection may be implemented so that multi-bit errors, incorrectly identifying caches storing a block, may be detected and corrected. An error correction code need not be used for all data blocks in directory 114 thereby reducing an amount of space used by directory 114. The error detection code, e.g. in the form of a parity field, may be sufficient to correct errors because a replication may be available. An error correction code may be used for tag and state fields. An error detection code may be used for sharer fields.

Figure 6:
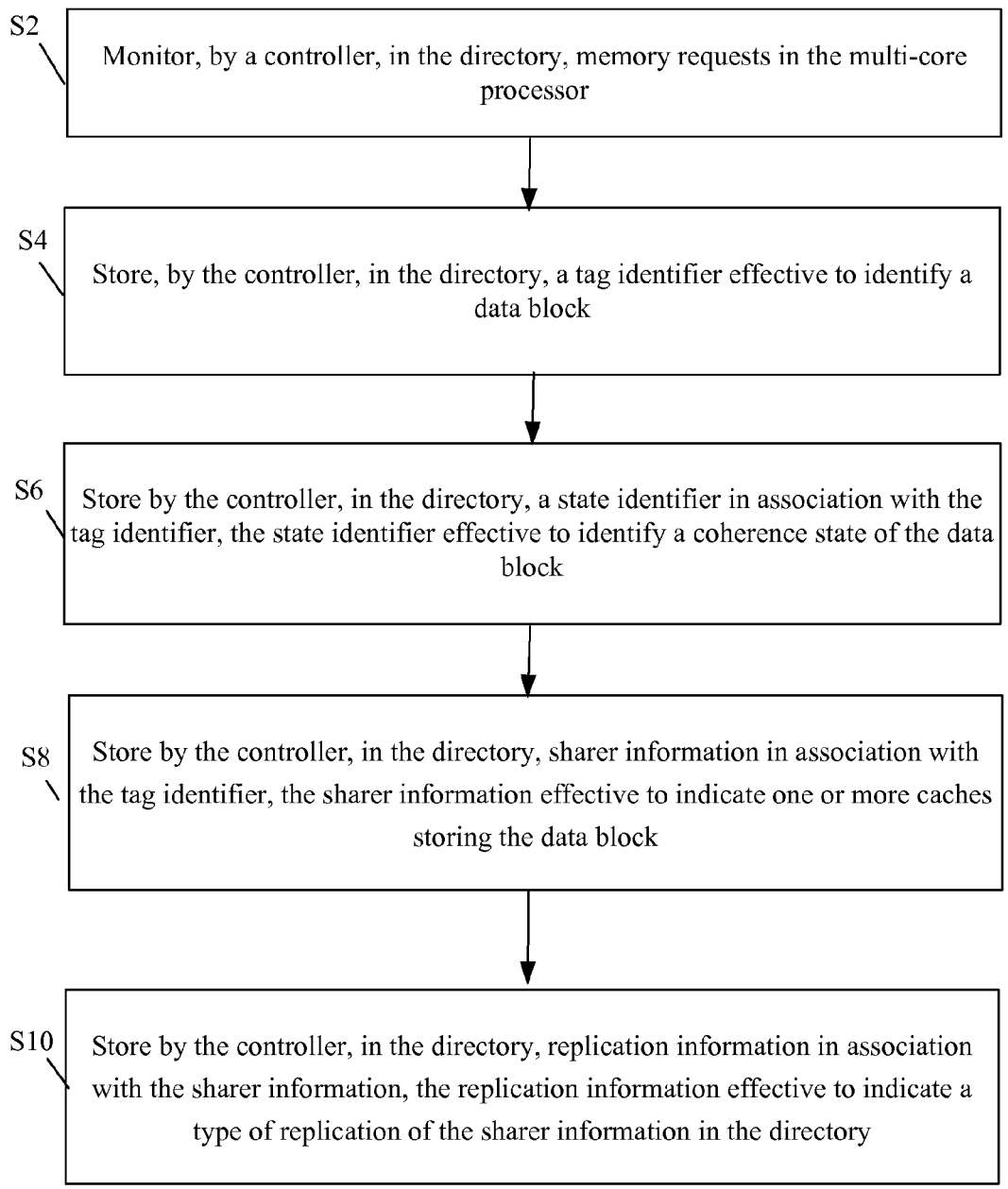
FIG. 6 depicts a flow diagram for an example process for implementing directory error correction in a multi-core processor architecture.

FIG. 6 depicts a flow diagram for an example process for implementing directory error correction in a multi-core processor architecture, arranged in accordance with at least some embodiments described herein. In some examples, the process in FIG. 6 could be implemented using system 100 discussed above and may be used for storing cache coherence information in a directory of a multi-core processor.

An example process may include one or more operations, actions, or functions as illustrated by one or more of blocks S2, S4, S6, S8 and/or S10. Although illustrated as discrete blocks, various blocks may be divided into additional blocks, combined into fewer blocks, or eliminated, depending on the desired implementation.

Processing may begin at block S2, "Monitor, by a controller, in the directory, memory requests in the multi-core processor." At block S2, a controller may monitor memory requests.

Processing may continue from block S2 to block S4, "Store, by the controller, in the directory, a tag identifier effective to identify a data block." At block S2, a controller may be configured (e.g., via executable instructions) to store a tag identifier effective to identify a data block.

Processing may continue from block S4 to block S6, "Store by the controller, in the directory, a state identifier in association with the tag identifier, the state identifier effective to identify a coherence state of the data block." At block S4, the directory controller may be configured effective to store a state identifier in association with the tag identifier. The state identifier may identify a coherence state of the block identified by the tag.

Processing may continue from block S6 to block S8, "Store by the controller, in the directory, sharer information in association with the tag identifier, the sharer information effective to indicate one or more caches storing the data block." At block S8, the directory controller may be configured to store sharer information indicating caches that may be storing the data block.

Processing may continue from block S8 to block S10, "Store by the controller, in the directory, replication information in association with the sharer information, the replication information effective to indicate a type of replication of the sharer information in the directory." At block S10, the directory controller may be configured effective to store replication information in association with the sharer information. The replication information may indicate a type of replication of the sharer information in the directory. For example, the sharer information may be replicated in multiples segments of the same row, or the sharer information may be replicated in another row, or the sharer information may be un-replicated.

In examples where sharer information for a particular block is determined to be invalid, the directory controller may use the replication information. The replication information may identify one or more segments in the sharer table that replicate the sharer information. The processor may process the request by analyzing the sharer information from the one or more segments.

Figure 7:
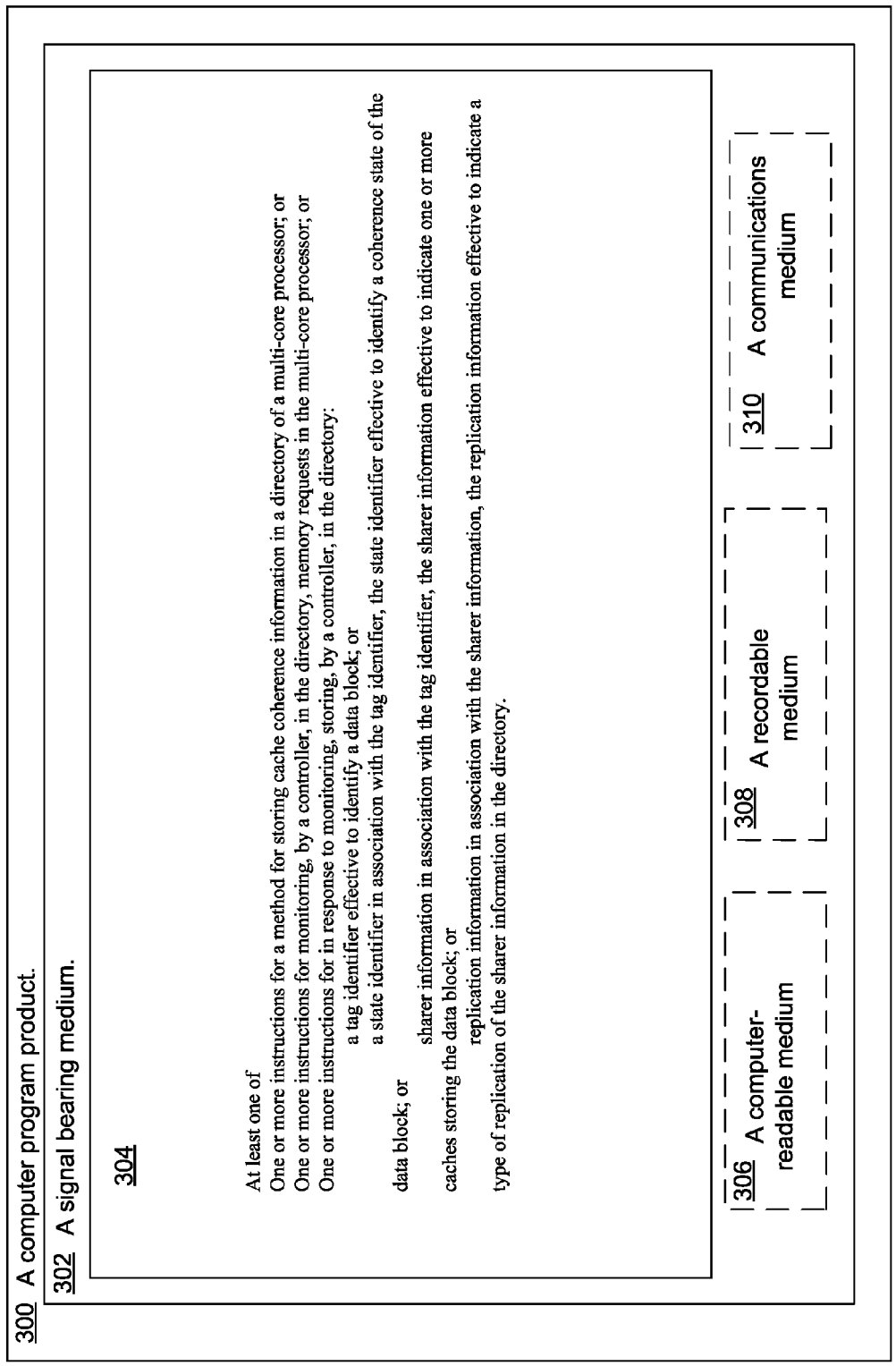
FIG. 7 illustrates a computer program product that can be utilized to implement directory error correction in a multi-core processor architecture.

FIG. 7 illustrates an example computer program product 300 that can be utilized to implement a directory error correction in a multi-core processor architecture, arranged in accordance with at least some embodiments described herein. Computer program product 300 may include a signal bearing medium 302. Signal bearing medium 302 may include one or more instructions 304 that, when executed by, for example, a processor, may provide the functionality described above with respect to FIGS. 1-6. Thus, for example, referring to system 100, one or more of processors 112 in tiles 118, 130-144 may undertake one or more of the blocks shown in FIG. 7 in response to instructions 304 conveyed to the system 100 by signal bearing medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 8 is a block diagram illustrating an example computing device 400 that is arranged to implement directory error correction in a multi-core processor architecture, in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a directory error correction algorithm 426 that is arranged to perform the functions as described herein including those described with respect to system 100 of FIGS. 1-3. Program data 424 may include directory error correction data 428 that may be useful to implement a directory error correction algorithm in multi-core processor architectures as is described herein. In some embodiments, application 422 may be arranged to operate with program data 424 on operating system 420 such that directory error correction in multi-core processor architectures may be provided. This described basic configuration 402 is illustrated in FIG. 8 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to store cache coherence information in a directory of a multi-core processor, the method comprising:
    monitoring, by a controller, memory requests in the multi-core processor;
    storing by the controller, in the directory, and based on the memory requests:
        a tag identifier effective to identify a data block;
        a state identifier in association with the tag identifier, the state identifier effective to identify a coherence state of the data block;
        sharer information in association with the tag identifier, wherein the sharer information is effective to indicate one or more caches that store the data block, and the sharer information is stored in at least a first segment in the directory; and
        replication information in association with the sharer information, wherein the replication information is effective to indicate a type of replication of the sharer information, the replication information is further effective to identify at least a second segment in the directory, and the second segment includes a replication of the sharer information;
    after storing the replication information and in response to detecting an error in the sharer information:
        accessing the replication information, and
        based on the replication information, using the second segment to correct the error.

2. The method of claim 1, wherein the replication information is further effective to indicate the first segment that stores the sharer information.

3. The method of claim 2, wherein the tag identifier includes a first tag identifier, and wherein the replication information is further effective to indicate a second tag identifier.

4. The method of claim 2, wherein at least two or more segments in the directory are of equal size.

5. The method of claim 1, further comprising storing, by the controller in the directory, an error correction code in association with the tag identifier and the state identifier.

6. The method of claim 1, wherein:
storing the sharer information includes storing the sharer information in a sharer table; and
storing the sharer information in the sharer table includes storing the sharer information in a sharer table that includes at least two segments.

7. The method of claim 6, further comprising storing, by the controller, one or more error detection codes, wherein each error detection code is associated with one or more segments in the sharer table.

8. The method of claim 6, wherein storing the replication information includes storing replication information that is effective to indicate that the sharer information is replicated in all segments in a row of the directory.

9. The method of claim 1, wherein:
the data block includes a first data block;
storing the sharer information includes storing the sharer information in a sharer table, wherein the sharer table includes the first segment and the second segment; and
the method further comprises, updating the directory by the controller so that:
the sharer information is effective to indicate, in the first segment, a first cache that stores the first data block;
the sharer information is effective to indicate, in the second segment, the first cache that stores the first data block; and
the replication information is further effective to indicate that the sharer information in the first segment is replicated in the second segment.

10. The method of claim 9, wherein:
the sharer table includes a third segment; and
the method further comprises, updating the directory by the controller so that the sharer information stored in the third segment is effective to indicate a second cache that stores the first data block.

11. The method of claim 1, wherein the tag identifier includes a first tag identifier, the state identifier includes a first state identifier, and the data block includes a first data block;
wherein storing the sharer information includes storing the sharer information in association with a second tag identifier, wherein the second tag identifier is effective to identify a second data block, and a second state identifier associated with the second tag identifier is effective to identify a coherence state of the second data block as uncached or invalid; and
wherein storing the replication information includes storing replication information in association with the first tag identifier, wherein the replication information is effective to indicate that the sharer information associated with the first tag identifier is replicated in the sharer information associated with the second tag identifier.

12. The method of claim 1, wherein:
storing the sharer information in the sharer table includes storing the sharer information in a sharer table that includes the first segment and the second segment;
storing the replication information includes storing replication information that includes a first slot corresponding to the first segment and a second slot corresponding to the second segment; and
storing the replication information includes storing replication information that includes a pointer in the first slot that points to the second segment.

13. The method of claim 1, wherein:
the tag identifier is stored in a first row in the directory; and
the replication information includes a pointer that points to a second row of the directory.

14. The method of claim 1, wherein:
the data block includes a first data block;
storing the tag identifier includes storing a first tag identifier in a first row of the directory;
storing the sharer information includes storing the sharer information in a sharer table;
storing the sharer information in the sharer table includes storing the sharer information in a sharer table that includes at least two segments; and the method further comprises:
determining, by the controller, that a number of bits of a cache identifier corresponding to the caches that store the first data block is larger than half a total number of bits in the at least two segments; and
identifying, by the controller, a second tag identifier stored in a second row of the directory, wherein the second tag identifier identifies a second data block and wherein a state identifier associated with the second tag identifier indicates an uncached or invalid state; and
wherein storing the replication information includes storing, by the controller, replication information for the first data block in the first row with a pointer that points to the second row.

15. A method to process a request for a data block in a multi-core processor, the method comprising:
receiving, by a controller in a cache coherence directory of the multi-core processor, the request;
identifying, by the controller, a tag identifier associated with the data block;
analyzing, by the controller:
a state identifier associated with the tag identifier, the state identifier is effective to indicate a cache coherence state of the data block,
sharer information associated with the tag identifier, wherein the sharer information is effective to indicate one or more caches that store the data block, the sharer information is stored in a sharer table including at least a first segment; and
replication information associated with the sharer information, wherein the replication information is effective to indicate a type of replication of the sharer information, the replication information is further effective to identify at least a second segment in the sharer table, the second segment includes a replication of the sharer information;
detecting, by the controller, an error in the first segment in the sharer table;
in response to detecting the error in the first segment in the sharer table, identifying, by the controller, using the replication information, at least the second segment that includes the replication of the sharer information;
correcting, by the controller, the error based on the replication information and using the second segment; and
processing, by the controller, the request by analyzing the sharer information from the identified second segment.

16. The method of claim 15, wherein detecting the error in the first segment includes detecting the error using one or more error detection codes, each associated with one or more segments in the sharer table.

17. The method of claim 15, wherein processing, by the controller, the request by analyzing the sharer information from the identified second segment comprises:
based upon the identified second segment, identifying, by the controller, address information for one or more caches in the multi-core processor that store the data block; and
sending, by the controller, a retrieved address information, in response to the request.

18. The method of claim 15, wherein identifying the tag identifier includes identifying a first tag identifier, and wherein identifying the second segment includes identifying one or more other segments that are associated with a second tag identifier.

19. The method of claim 15, wherein the error in the first segment includes a first error, the method further comprising:
detecting a second error in the identified second segment;
in response to detecting the second error in the identified second segment:
broadcasting a message to one or more caches of the multi-core processor;
receiving one or more reply messages from the one or more caches of the multi-core processor; and
based upon the received reply messages, updating at least the second segment in the sharer table.

20. A multi-core architecture effective to process a request for a data block, the architecture comprising:
a first tile including a first processor and a first cache;
a second tile including a second processor and a second cache;
a controller configured in communication with the first tile and the second tile; and
wherein the controller is effective to:
monitor memory requests among the first tile and the second tile; and based on the memory requests:
store, in a directory, a tag identifier effective to identify a data block;
store, in the directory, a state identifier in association with the tag identifier, the state identifier effective to identify a coherence state of the data block;
store, in the directory, sharer information in association with the tag identifier, wherein the sharer information is effective to indicate one or more caches that store the data block, the one or more caches include the first cache and the second cache, and the sharer information is stored in at least a first segment in the directory; and
store, in the directory, replication information in association with the tag identifier, wherein the replication information is effective to indicate a type of replication of the sharer information, the replication information is further effective to identify at least a second segment in the directory, and the second segment includes a replication of the sharer information;
after storage of the replication information and in response to detection of an error in the sharer information:
access the replication information, and
based on the replication information, use the second segment to correct the error.

21. The architecture of claim 20, wherein the replication information is further effective to indicate the first segment that stores the sharer information.

22. The architecture of claim 21, wherein the tag identifier includes a first tag identifier, and wherein the replication information is further effective to indicate a second tag identifier.

23. The architecture of claim 20, wherein:
the controller is further configured to store the sharer information in a sharer table; and
the sharer table includes at least two segments.

24. The architecture of claim 20, wherein the replication information is further effective to indicate that the sharer information is replicated in all segments in a row of the directory.

25. The architecture of claim 20, wherein:
the controller is configured to store the sharer information in a sharer table, and wherein:
the data block includes a first data block;
the sharer table includes the first segment, and the second segment; and
the controller is effective to update the directory so that:
the sharer information indicates, in the first segment, a first of the one or more caches that stores the first data block;
the sharer information indicates, in the second segment, the first of the one or more caches that stores the first data block; and
the replication information indicates that the sharer information in the first segment is replicated in the second segment.

26. The architecture of claim 25, wherein:
the sharer table includes a third segment, wherein the sharer information stored in the third segment is effective to indicate a second of the one or more caches that stores the first data block.

27. The architecture of claim 20, wherein:
the controller is configured to store the sharer information in a sharer table;
the controller is effective to update the directory so that:
the sharer table includes the first segment and the second segment;
the replication information includes a first slot corresponding to the first segment and a second slot corresponding to the second segment; and
the replication information includes a pointer in the first slot effective to point to the second segment.

28. The architecture of claim 20, wherein:
the controller is configured to store the tag identifier in a first row in the directory; and
the controller is effective to update the directory so that the replication information in the first row includes a pointer effective to point to a second row of the directory.

29. The architecture of claim 20, wherein:
the controller is configured to store the sharer information in a sharer table, wherein the sharer table includes at least the first segment and the second segment; and
the controller is further configured to:
receive a request for the data block;
analyze the sharer information to identify a cache identifier stored in the sharer information at least twice; and
process the cache identifier in response to the request for the data block.

30. The architecture of claim 20, wherein the controller is configured to:
store a first tag identifier in a first row of the directory, where the first tag identifier corresponds to a first data block; and store the sharer information in a sharer table, where the sharer table includes at least two segments; and the controller is further effective to:

determine that a number of caches effective to store the first data block is greater than half a number of the at least two segments;

identify a second tag identifier in a second row, where the second tag identifier identifies a second data block and wherein a state associated with the second tag identifier is an uncached or invalid state; and store replication information for the first data block in the first row with a pointer effective to point to the second row.

31. The architecture of claim 23, wherein two or more segments of the at least two segments in the sharer table are of equal size.

* * * * *